United States Patent [19]
Trimmer et al.

[11] 4,286,459
[45] Sep. 1, 1981

[54] FORCE SENSOR

[75] Inventors: William S. N. Trimmer, Morris Plains, N.J.; Mark R. Laser, New York, N.Y.

[73] Assignee: Johnson & Johnson, New Brunswick, N.J.

[21] Appl. No.: 89,670

[22] Filed: Oct. 30, 1979

[51] Int. Cl.³ .............................................. G01L 1/10
[52] U.S. Cl. ........................... 73/862.59; 73/DIG. 1; 73/DIG. 4; 73/862.68
[58] Field of Search .................... 73/141 A, 144, 143, 73/DIG. 1, DIG. 4, 141 R

[56] References Cited

U.S. PATENT DOCUMENTS

| 3,871,217 | 3/1975 | Miley | 73/143 |
| 4,109,520 | 8/1978 | Eriksson | 73/143 |
| 4,158,962 | 6/1979 | Conoval | 73/143 |

FOREIGN PATENT DOCUMENTS

| 216326 | 7/1968 | U.S.S.R. | 73/DIG. 1 |

Primary Examiner—Donald O. Woodiel

[57] ABSTRACT

Positive feedback is utilized with a flexible piezoelectric strip that is stretched in tension to cause the strip to oscillate at a frequency which is determined by the magnitude of the force stretching the flexible strip. Since the oscillation frequency can readily be measured, the strip is utilized as a device for measuring tension.

12 Claims, 4 Drawing Figures

FORCE SENSOR

BACKGROUND OF THE INVENTION

This invention relates to force sensors and more particularly to a piezoelectric tension sensing device that has a digital output.

Microprocessors are increasingly being used in control devices and systems. Most sensing devices provide an analog output. Since the microprocessor operates on digital data, analog to digital converters are used to convert the analog signals into digital signals that can be used by the microprocessor. Such analog to digital converters are relatively expensive and add to the complexity of the control system or device. Accordingly, it is desirable to have sensors that provide a digital output in order to eliminate the need for the analog to digital converters.

Accordingly, one object of this invention is to provide a sensor that has a digital output.

Another object of this invention is to provide a piezoelectric force sensor.

Still another object of this invention is to provide a piezoelectric sensor that measures tension.

Still another object of this invention is to provide a digital force sensor that has a pulse output the frequency of which is determined by the force being measured.

SUMMARY OF THE INVENTION

Briefly described, the present invention is directed to a force sensor that includes at least one strip of flexible piezoelectric material having an electrically conductive coating on opposite sides thereof. The flexible piezoelectric strip changes its length when a voltage is applied to its coated surfaces and when the strip is stretched a voltage is produced across the coated surfaces. A mass may be placed on the piezoelectric strip and positive electrical feedback means are coupled between the coated surfaces of the piezoelectric strip. When a force is applied to the piezoelectric strip causing it to stretch, the strip will oscillate at a frequency that is determined by the magnitude of the applied force. Accordingly, the magnitude of the applied force can be determined by measuring the frequency of the resulting oscillation.

DESCRIPTION OF THE DRAWINGS

The various features, objects and advantages of the present invention will be readily apparent from the following detailed description taken in conjunction with the following drawings, wherein like reference characters designate like or corresponding parts throughout the several views, and wherein.

DESCRIPTION OF THE INVENTION

Figure 1:
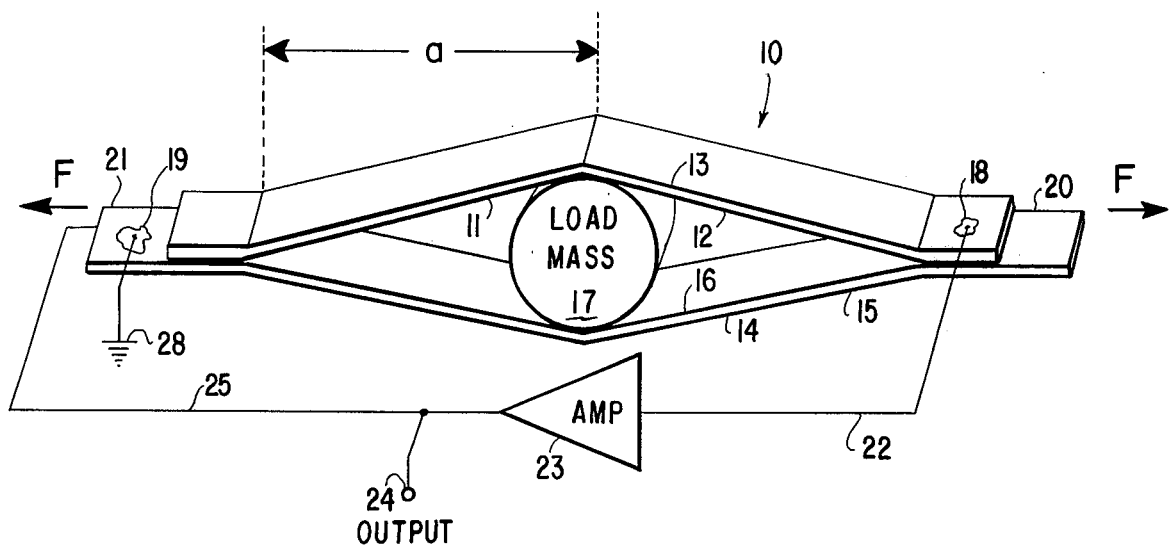
FIG. 1 illustrates a preferred embodiment of the present invention.

A digital force sensor in accordance with the present invention is generally designated in FIG. 1 by the reference number 10 and includes a first elongated strip 11 of flexible piezoelectric material. Opposite sides of the strip are coated with a thin film of electrically conductive material 12 and 13. A second elongated strip 14 of flexible piezoelectric material also has a thin film of electrically conductive material 15 and 16 coated on opposite sides thereof. In accordance with a preferred embodiment of the present invention, the flexible piezoelectric material 11 and 14 is polyvinylidene fluoride ($PVF_2$) and the electrically conductive material 12, 13, 15 and 16 is any suitable electrical conductor such as aluminum, gold, tin oxide or the like which is vapor deposited, sputtered or otherwise applied onto the strips 11 and 14.

The electrically conductive coatings 12 and 16 are electrically connected to one another at the ends of the piezoelectric strips 11 and 14 as shown. This is accomplished by using an electrically conductive binder such as silver epoxy or by pressure provided by suitable clamping devices (not shown). The electrically conductive coatings 12 and 16 are connected to a reference potential, such as ground, by a lead 28 which is secured to the coating 16 by any suitable material such as silver epoxy. A positive, electrical feedback path is coupled between the conductive coatings 13 and 15 on strips 11 and 14, respectively, and includes an amplifier 23 the input of which is coupled to the coating 13 on strip 11 by way of a lead 22 with the output of the amplifier 23 being coupled to the coating 15 on the strip 14 by way of a lead 25. The output of the amplifier 23 is also available on an output terminal 24. The lead 22 is secured to the coating 13 by a suitable binder such as silver epoxy with lead 25 being secured to the coating 15 in a like manner. A cylindrical load mass 17 is located between the strips 11 and 14 substantially midway between the ends of the strips 11 and 14. The mass 17 is held in place by pressure provided by the strips 11 and 14 by a suitable flexible material such as silicon rubber. The mass 17 may be fabricated from any suitable material such as wood, plastic or metal.

The characteristics of the flexible piezoelectric strips 11 and 14 are such that when they are stretched in tension a charge density is induced in their surfaces resulting in a voltage appearing on the coatings 13 and 15, respectively. Conversely, when a voltage is applied on the coatings 13 and 15 the strips 11 and 14, respectively, will change their length i.e. contract or expand depending upon the polarity of the voltage.

Figures 2, 3:
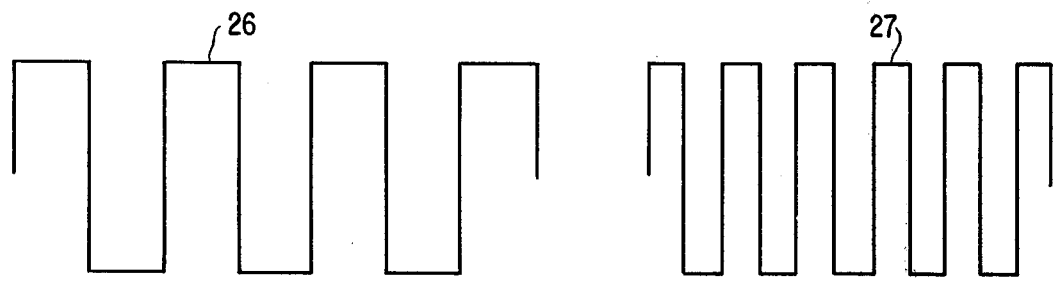
FIGS. 2 and 3 illustrate idealized waveforms generated by the embodiment shown in FIG. 1.

In operation the device 10 is placed in series with a tension force F to be measured by clamping the force bearing means (not shown) to the ends of the strip 14 by any suitable means (not shown). The force F will stretch the strips 11 and 14 and induce the same polarity voltage in the coatings 13 and 15. However, the voltage appearing on the coating 13 is amplified and reversed in polarity by the amplifier 23 and applied to the coating 15 to override the voltage induced therein causing the voltage on the coating 15 to have a polarity which is the reverse of that appearing on the coating 13. Accordingly, if the strip 11 is expanding the strip 14 will contract and vice versa. For example, assume that the strip 11 is contracting moving the mass 17 down. The reverse polarity voltage on the coating 15 will cause the strip 14 to expand to aid the downward movement of the mass 17. This downward movement of the mass 17 will continue until the elastic properties of the strip 14 start to push the mass 17 up to its original position. When this occurs the strip 11 expands thereby reversing the polarity on the coating 13. This voltage is reversed in polarity by the amplifier 23 and applied to the coating 15 causing the strip 14 to further contract to aid in the upward movement of the mass 17. This will continue until the elastic properties of the strip 11 cause the mass 17 to again move downward and repeat the process. As is now apparent, placing the device 10 in series with a force F causes the mass 17 and strips 11 and 14 to oscillate. The voltage polarity reversals in the coating 13 are substantially sinusoidal. However, if amplifier 23 has a large gain, the output on leads 24 and 25 will have essentially a square waveshape. This produces a digital output as shown by FIGS. 2 and 3.

The frequency of the pulse signal on the output terminal 24 is determined by the magnitude of the force F and the geometry of the device 10 and can be expressed by the formula $$f = \sqrt{\frac{2F}{Ma}}$$

where f is the frequency of oscillation, M is the weight of the mass 17 and "a" is half the length of the strips 11 and 14 between the connections of coating 12 on the strip 11 with the coating 16 on the strip 14. Accordingly, an increasing force F will produce a higher frequency of oscillation. FIG. 2 illustrates an output signal for a given force F and the output for a greater force F is illustrated in FIG. 3. As shown the output signals 26 and 27 are digital and their frequency can readily be determined to measure the magnitude of the Force F.

In one embodiment of the present invention which was constructed the load mass was 2.3 grams, "a" was 2.9 centimeters and the device produced a range of oscillations from 166 $H_z$ to 232 $H_z$ for a range of force from one to ten pounds.

Figure 4:
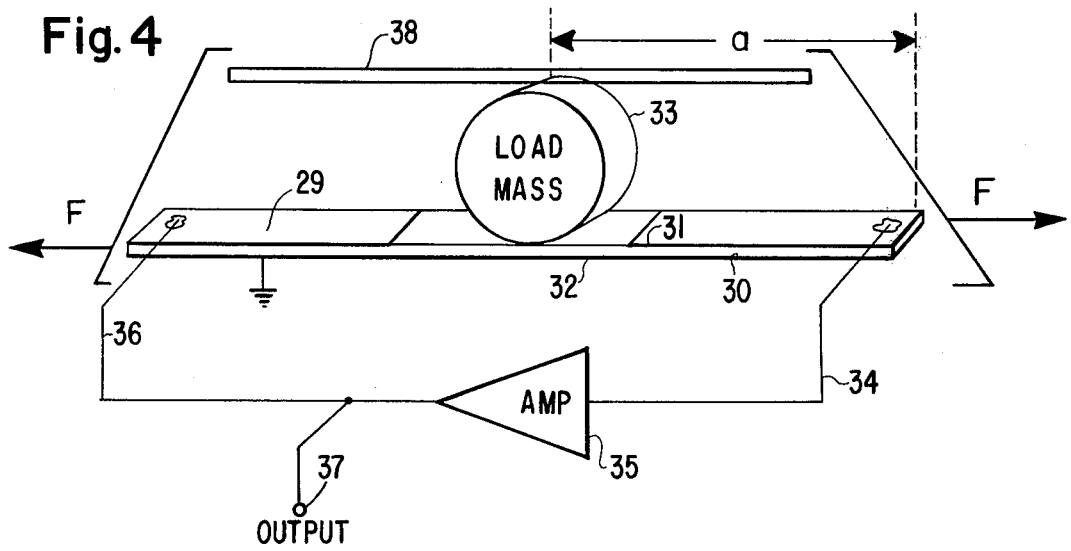
FIG. 4 illustrates a modification of the device shown in FIG. 1.

A modification of the device shown in FIG. 1 is illustrated in FIG. 4 as including a single strip 30 of flexible piezoelectric material having substantially equal length electrically conductive coatings 29 and 31 on one side thereof. The opposite side of the strip 30 also contains a coating 32 of electrically conductive material that is coupled to a reference potential such as ground. A load mass 33 is secured to the strip 30 midway between the ends thereof. A positive feedback loop includes an amplifier 35 having its input coupled to the coating 31 by way of a lead 34 and its output coupled to the coating 29 by way of a lead 36. The output signal of the device appears on terminal 37. The operation of the device illustrated in FIG. 4 is similar to that described above in conjunction with FIGS. 1 through 3. In the device of FIG. 4, however, when an applied force F stretches the strip 29, the induced voltage on coating 31 is amplified and applied to coating 29. This causes the portion of the strip covered by coating 29 to stretch. As will be apparent, this arrangement causes the load mass 33 to oscillate.

A cable 38 may be attached to the mass 33 and placed in series with the tension force F to be measured. The frequency of oscillation of the mass 33 is determined primarily by the force F on the cable 38 and the mass 33 in a manner similar to the device of FIG. 1. In most applications, the stiffness of the strip 29 is small in comparison with the stiffness of the cable 38, and the strip 29 has little influence on the frequency of oscillation of the load mass 33. Often one wants the strip 29 to bend at the point of contact with the mass 33. This increases the ability of the strip 29 to force the mass 33 to oscillate. The device can readily be calibrated by measuring the oscillation frequency for known forces F.

Other embodiments and modifications of the present invention described herein will be apparent to those skilled in the art without departing from the spirit and scope of this invention as defined by the following claims.

We claim:

1. A force measuring device comprising:
    a strip of flexible piezoelectric material;
    at least first and second electrically conductive coatings on said strip;
    a mass on said strip intermediate the ends thereof;
    positive feedback means coupled between said conductive coatings; and
    means to enable a force to be applied to at least one end of said strip thereby causing said strip and said mass to oscillate at a frequency determined by the magnitude of said force.

2. The force measuring device according to claim 1 wherein
    said force causes said strip to be stretched in tension.

3. The force measuring device according to claim 1 wherein
    a charge density is induced across the surfaces of the strip when it is stretched and said strip changes its length when an electrical voltage is applied across its surfaces.

4. The force measuring device according to claim 1 wherein
    said flexible strip is polyvinylidene fluoride.

5. The force measuring device according to claim 1 wherein
    said positive feedback loop includes an amplifier.

6. The force measuring device according to claim 5 wherein
    said amplifier is biased to be overdriven to produce electrical pulses the frequency of which is determined by the magnitude of said force.

7. A force measuring device comprising:
    a first strip of flexible piezoelectric material;
    an electrically conductive coating on opposite sides of said first strip;
    a second strip of flexible piezoelectric material;
    an electrically conductive coating on opposite sides of said second strip;
    said conductive coating on one side of said first strip being electrically coupled to the conductive coating on one side of said second strip adjacent to each end of said first and second strips;
    said electrically coupled coatings on said first and second strips connected to a reference potential;
    positive electrical feedback means coupled between the other conductive coating on said first strip and the other conductive coating on said second strip;
    a mass located between said first and second strips intermediate the ends thereof; and
    means to enable a force to be applied to at least one end of said strip(s) thereby causing said strips and said mass to oscillate at a frequency determined by the magnitude of said force.

8. The force measuring device according to claim 7 wherein
    said first and second strip is polyvinylidene fluoride.

9. The force measuring device according to claim 7 wherein
    said force causes said first and second strips to be stretched in tension.

10. The force measuring device according to claim 9 wherein a charge density is induced across the coated surfaces of said strips when they are stretched and said strips change their length when an electrical voltage is applied across their coated surfaces.

11. The force measuring device according to claim 10 wherein said positive feedback loop includes an amplifier.

12. The force measuring device according to claim 11 wherein said amplifier is biased to be overdriven to produce electrical pulses having a frequency determined by the magnitude of said force.

* * * * *